(12) United States Patent
Manda Venkata Naga et al.

(10) Patent No.: US 10,894,237 B2
(45) Date of Patent: Jan. 19, 2021

(54) REDUCTANT NOZZLE WITH CONCAVE IMPINGING SURFACE

(71) Applicant: Caterpillar Inc., Deerfield, IL (US)

(72) Inventors: Satya Ramakrishna Manda Venkata Naga, Dunlap, IL (US); Kevin L. Martin, Washburn, IL (US); Paul Arthur Zwart, Dunlap, IL (US); Andrew M. Denis, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 149 days.

(21) Appl. No.: 16/192,614

(22) Filed: Nov. 15, 2018

(65) Prior Publication Data
US 2020/0156022 A1    May 21, 2020

(51) Int. Cl.
| | | |
|---|---|---|
| *B05B 7/10* | (2006.01) | |
| *B01F 5/04* | (2006.01) | |
| *B05B 7/04* | (2006.01) | |
| *B01D 53/18* | (2006.01) | |
| *B01D 53/94* | (2006.01) | |
| *F01N 3/20* | (2006.01) | |
| *F01N 13/08* | (2010.01) | |

(52) U.S. Cl.
CPC .......... *B01F 5/0451* (2013.01); *B01F 5/0461* (2013.01); *B05B 7/0466* (2013.01); *B05B 7/10* (2013.01); *B01D 53/185* (2013.01); *B01D 53/9431* (2013.01); *F01N 3/2066* (2013.01); *F01N 13/08* (2013.01); *F01N 2610/02* (2013.01); *F01N 2610/1453* (2013.01)

(58) Field of Classification Search
CPC .... B01F 3/04049; B01F 5/045; B01F 5/0689; B01F 5/0451; B01F 5/0602; B01F 3/04063; B01F 5/0461; F01N 3/2066; F01N 2610/02; F01N 2610/1453; F01N 13/08; F01N 3/206; F01N 3/36; B01D 53/185; B05B 7/0416; B05B 7/0408; B05B 7/0892; B05B 7/10; B05B 7/0466
See application file for complete search history.

(56) References Cited

U.S. PATENT DOCUMENTS

| | | | | |
|---|---|---|---|---|
| 3,493,181 A | * | 2/1970 | Goodnight | F23D 11/102 239/419.3 |
| 4,284,239 A | * | 8/1981 | Ikeuchi | F23D 11/12 239/8 |
| 5,014,790 A | * | 5/1991 | Papavergos | A62C 5/024 169/44 |

(Continued)

FOREIGN PATENT DOCUMENTS

| | | |
|---|---|---|
| CN | 104259025 | 1/2015 |
| CN | 104259025 A * | 1/2015 |

(Continued)

*Primary Examiner* — Matthew T Largi
(74) *Attorney, Agent, or Firm* — Hibshman Claim Construction PLLC

(57) ABSTRACT

A nozzle including an interior cavity, a structure disposed within the interior cavity, a first channel fluidly connected to the interior cavity, one or more second channels fluidly connected to the interior cavity, and one or more outlets coupled to the interior cavity. The structure includes a bottom impinging surface that is at least partially concave, one or more legs that support the bottom impinging surface, and a top surface located opposite the bottom impinging surface.

17 Claims, 11 Drawing Sheets

(56) References Cited

U.S. PATENT DOCUMENTS

| | | | |
|---|---|---|---|
| 5,553,783 A * | 9/1996 | Slavas | B05B 1/3405 |
| | | | 239/403 |
| 5,732,885 A | 3/1998 | Huffman | |
| 5,810,252 A * | 9/1998 | Pennamen | B05B 7/0441 |
| | | | 239/8 |
| 6,267,301 B1 * | 7/2001 | Haruch | B05B 7/0458 |
| | | | 239/290 |
| 6,322,003 B1 * | 11/2001 | Haruch | B05B 7/0458 |
| | | | 239/290 |
| 6,415,602 B1 * | 7/2002 | Patchett | B01D 53/90 |
| | | | 60/286 |
| 2004/0222317 A1 | 11/2004 | Huffman | |
| 2009/0226362 A1 | 9/2009 | Randolph, III et al. | |
| 2014/0102084 A1 | 4/2014 | Toshev et al. | |
| 2015/0028132 A1 * | 1/2015 | Vidusek | F23J 15/003 |
| | | | 239/403 |
| 2015/0167525 A1 | 6/2015 | Assalve et al. | |
| 2016/0108838 A1 | 4/2016 | Inoue | |
| 2017/0128884 A1 | 5/2017 | Goffe | |

FOREIGN PATENT DOCUMENTS

| | | |
|---|---|---|
| DE | 102014207657 | 7/2015 |
| KR | 20110131032 | 12/2011 |
| KR | 20160106414 A | 9/2016 |

* cited by examiner

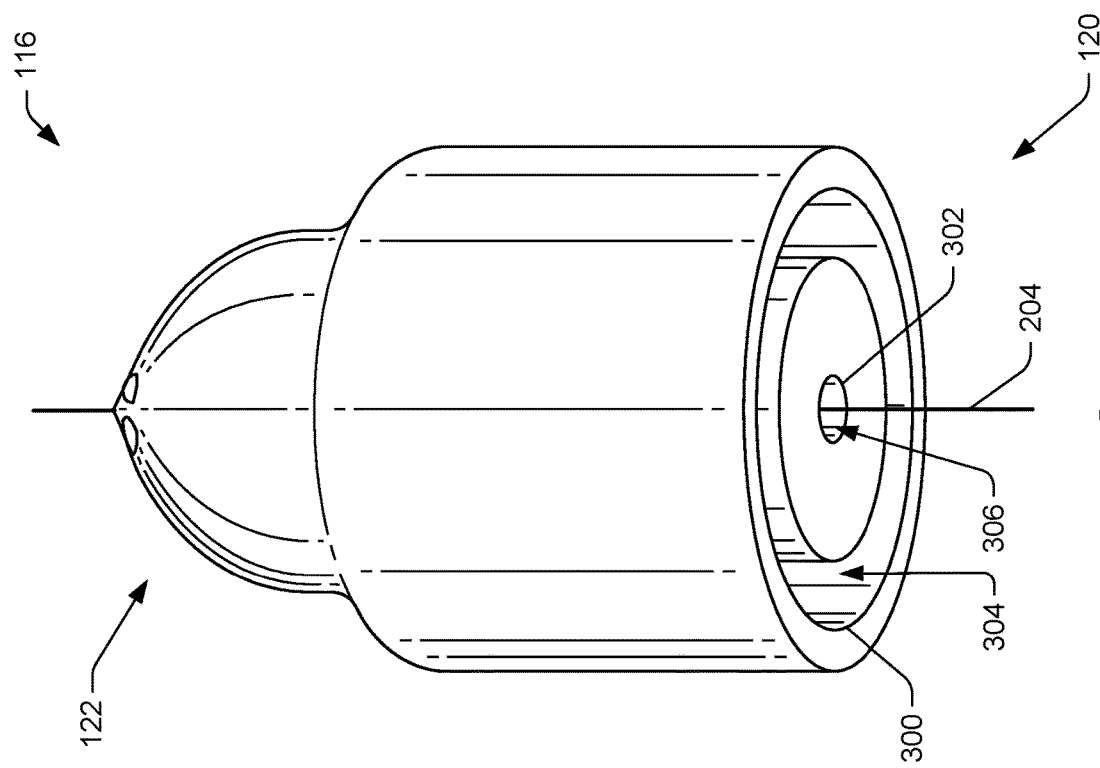
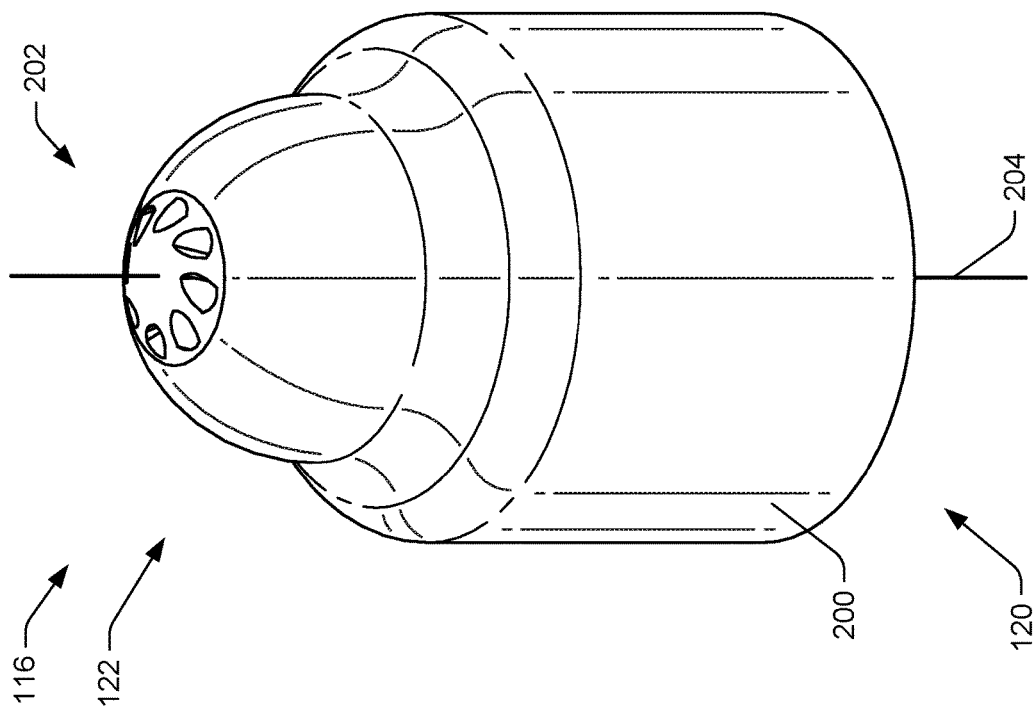

REDUCTANT NOZZLE WITH CONCAVE IMPINGING SURFACE

TECHNICAL FIELD

The present disclosure is directed to an exhaust treatment system and, more particularly, to a nozzle that injects a reductant solution into a fluid path within an exhaust treatment system.

BACKGROUND

Internal combustion engines, such as diesel engines, gasoline engines, gaseous fuel-powered engines, and other engines known in the art, exhaust a complex mixture of components. These components may include nitrogen oxides ($NO_x$), such as NO and $NO_2$. Due to an increased focus on avoiding environmental pollution, exhaust emission standards are becoming more stringent, and the amount of $NO_x$ emitted from engines may be regulated depending on engine size, engine class, and/or engine type. To ensure compliance with the regulation of these compounds, as well as reduce harmful effects on the environment, some engine manufacturers have implemented a strategy called Selective Catalytic Reduction (SCR). SCR is a process where gaseous and/or liquid reductant, most commonly urea (($NH_2$)2CO), is selectively added to engine exhaust using one or more nozzles. The injected reductant decomposes into ammonia ($NH_3$), reacts with the $NO_X$ in the exhaust, and forms water ($H_2O$) and diatomic nitrogen ($N_2$).

As described in U.S. Patent Application Publication No. 2004/0222317 to Huffman, published on Nov. 11, 2004 (hereinafter referred to as the '317 reference), spray nozzles may utilize pressurized air to break down reductant into relatively small particles. In particular, the '317 reference describes a multi-stage spray nozzle assembly, where at a first stage, liquid reductant impinges an end wall and disperses outward to mix with air. At a later stage, the stream of reductant and air strikes an impingement fan to further break down and reduce the particle size of the mixture. The stream is directed to spray tip orifices for discharging into exhaust.

While the spray nozzle of the '317 reference may attempt to increase the atomization of the reductant, the spray nozzle may be suboptimal. For example, the spray nozzle described in the '317 reference is relatively small in size, and due to the limited internal volume of the spray nozzle, effective atomization of the reductant may be difficult to achieve. Additionally, the impinging surface discussed in the '317 reference is flat, and this configuration may further hinder the atomization of the reductant. In such instances, the non-atomized reductant will not react with the $NO_x$, when injected into the exhaust, and as a result, the efficiency of the nozzle may be limited. Moreover, impinging reductant upon a flat surface, as described in the '317 reference, may unevenly distribute or disperse the reductant within the nozzle. As a result, the reductant may not uniformly mix with air that is provided to the nozzle, potentially leading to a sub-optimal atomization. Further, the '317 reference describes a nozzle having multiple distinct and assembled parts, and such a nozzle configuration may increase the size, complexity, assembly time, and/or manufacturing cost of the nozzle. Such multi-part nozzles are also often difficult to clean and may become clogged easily.

Example embodiments of the present disclosure are directed toward overcoming one or more of the deficiencies described above.

SUMMARY OF THE INVENTION

In an example embodiment of the present disclosure, a nozzle comprises a first end including a first inlet and a second inlet, a second end including a nozzle outlet. A first channel fluidly connects to the first inlet and extends substantially parallel to a longitudinal axis of the nozzle. A second channel fluidly connects to the second inlet and extends substantially parallel to the longitudinal axis of the nozzle. The nozzle comprises an interior cavity including a first outlet fluidly connected the first channel, a second outlet fluidly connected to the second channel, and an impinging surface that is concave-shaped and spaced apart from the second outlet. A third channel fluidly connects to the nozzle outlet.

In another example embodiment of the present disclosure, a nozzle comprises an interior cavity, a first channel fluidly connected to the interior cavity, one or more second channels fluidly connected to the interior cavity, and one or more outlets coupled to the interior cavity. A structure is disposed within the interior cavity, where the structure includes a bottom impinging surface that is at least partially concave-shaped. The structure includes one or more legs that support the bottom impinging surface. A top surface of the structure that is at least partially conical-shaped and is located opposite the bottom impinging surface.

In yet another example embodiment of the present disclosure, an exhaust system comprises an exhaust pipe, a nozzle located with the exhaust pipe, and a supply line fluidly connected to the nozzle. The nozzle comprises an interior cavity having a bottom end, a top end, and a sidewall extending from the bottom end to the top end. A channel having a first outlet is disposed at the bottom end of the interior cavity, a passageway having a second outlet is disposed at the sidewall of the interior cavity, and a spray outlet is disposed at the top end of the interior cavity. The interior cavity comprises structure that includes a first side facing the bottom end of the interior cavity. A leg extends of the structure from the bottom end of the interior cavity and couples to the first side to space the first side from the bottom end of the interior cavity. The first side of the structure includes a substantially concave-shaped surface and is located adjacent to the first outlet of the channel.

BRIEF DESCRIPTION OF DRAWINGS

FIG. 2 is a top perspective view of the nozzle of FIG. 1 in accordance with an example embodiment of the present disclosure.

FIG. 3 is a bottom perspective with of the nozzle of FIG. 1 in accordance with an example embodiment of the present disclosure.

DETAILED DESCRIPTION

This disclosure generally relates to nozzles useful for injecting a mixture of reductant and air into an exhaust stream. Wherever possible, the same reference number(s) will be used through the drawings to refer to the same or like features. In the figures, the left-most digit(s) of a reference number identifies the figure in which the reference number first appears.

Figure 1:
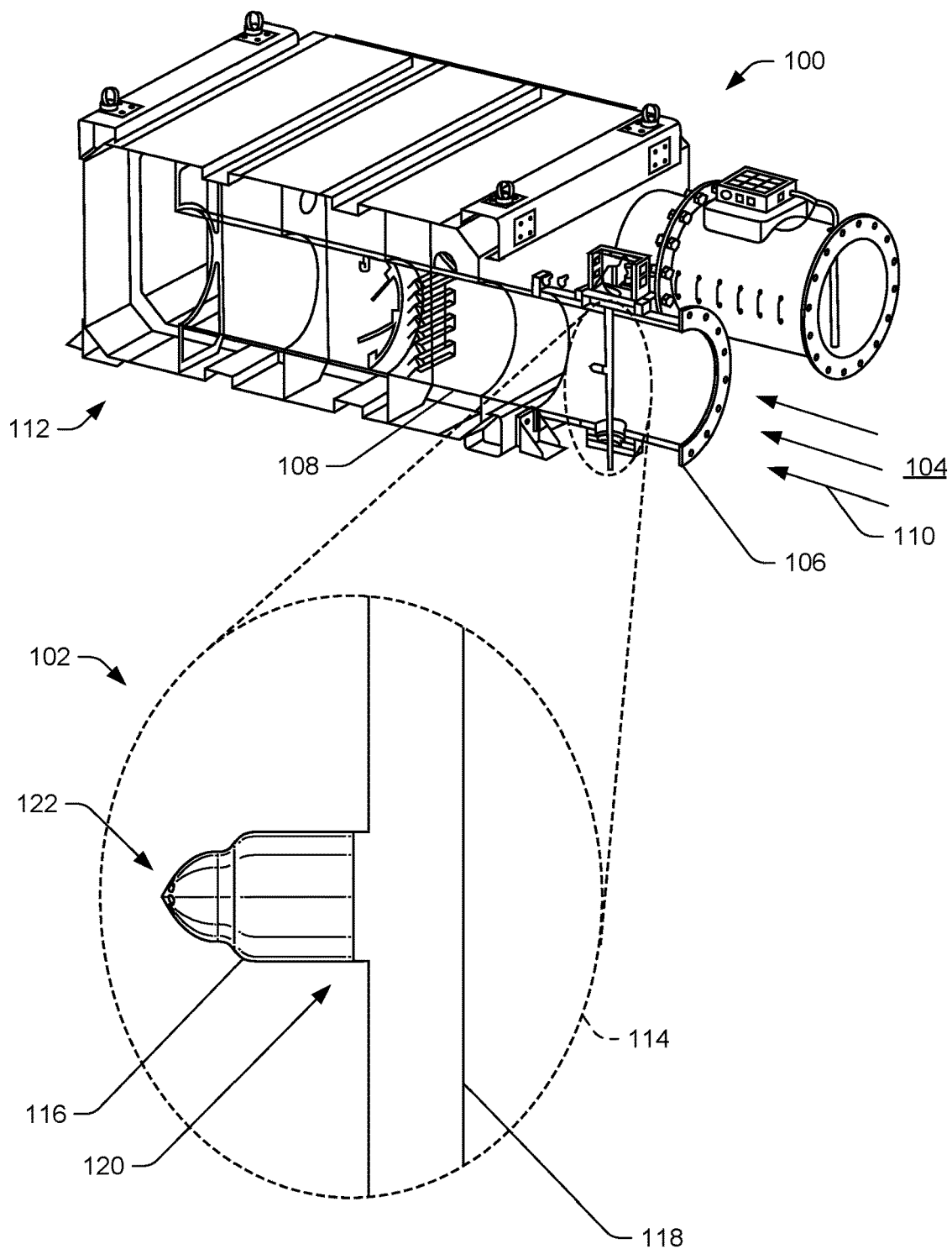
FIG. 1 is a perspective view of an exhaust treatment system, showing an example nozzle in accordance with an example embodiment of the present disclosure.

FIG. 1 illustrates an example exhaust system 100. For the purposes of this disclosure, the exhaust system 100 is depicted and described in use with a diesel-fueled, internal combustion engine. However, it is contemplated that the exhaust system 100 may embody any exhaust system useable with any other type of combustion engine such as, a gasoline or a gaseous fuel-powered engine, or an engine fueled by compressed or liquefied natural gas, propane, or methane.

The example exhaust system 100 includes components that condition byproducts of combustion. For example, the exhaust system 100 may include a treatment system 102 that removes regulated constituents from exhaust 104 and/or acts on such regulated constituents. The exhaust 104 may be produced by an engine (not shown), and may enter the exhaust system 100 via an exhaust inlet 106 of an exhaust pipe 108. Upon entering the exhaust system 100, the exhaust 104 may pass within the exhaust pipe 108 in the direction of arrows 110, and may exit the exhaust system 100 via an exhaust outlet 112.

Within the exhaust pipe 108, the exhaust 104 may undergo one or more treatment processes. For example, the treatment processes may include a conversion of NO to $NO_2$. A portion of the treatment system 102 is shown in greater detail in the enlarged view 114. Among other components, the treatment system 102 may include a nozzle 116 that receives reductant and air, facilitates mixing of reductant and air to atomize the reductant, and disperses a reductant and air solution into the exhaust 104. In some examples, the reductant received by the nozzle 116 may include a gaseous or liquid reductant. For example, such a reductant may be ammonia gas, liquefied anhydrous ammonia, ammonium carbonate, an amine salt solution, or a hydrocarbon such as diesel fuel, capable of being sprayed or otherwise advanced by the nozzle 116 and into the exhaust 104.

The example treatment system 102 may also include a supply line 118, and the supply line 118 may be configured to feed the nozzle 116 with fluid and/or gas useful in treating the exhaust 104. In some examples, the supply line 118 may include multiple distinct supply lines (e.g., the supply line 118 may comprise a double pipe) such as a compressed air line, and a reductant supply line that may be separate from the compressed air line. In such examples, the compressed air line may supply compressed air to the nozzle 116 and the reductant supply line may supply reductant to the nozzle 116. The treatment system 102 may also include a compressor (not shown) configured to supply compressed air via the supply line 118, and one or more reservoirs and pumps (not shown) configured to supply reductant via the supply line 118. In some embodiments, an amount of compressed air and/or an amount of reductant supplied may depend on a flow rate of the exhaust 104, an operational state of the engine (e.g., rpm), a temperature of the exhaust 104, a concentration of $NO_x$ in the exhaust 104, and/or one or more other operating conditions of the treatment system 102 or of the engine. For example, as the flow rate of the exhaust 104 decreases, a controller or other control component (not shown) operably connected to the pump may control the pump to commensurately decrease the amount of reductant and/or air supplied to the nozzle 116 (and thereby introduced into the exhaust 104). Alternatively, as the flow rate of the exhaust 104 increases, the controller or other control component may increase the amount of reductant and/or air supplied to the nozzle 116.

The nozzle 116 may be fluidly connected to the supply line 118, at a first end 120 of the nozzle 116, via one or more fittings or couplers configured to receive air and/or reductant via the supply line 118. Additionally, the nozzle 116 may be disposed within the exhaust pipe 108 at a fixed location, and the supply line 118 may support the nozzle 116 at any location within an inner passage formed by the exhaust pipe 108. In some examples, the may nozzle 116 may be disposed substantially centrally within the exhaust pipe 108. In other examples, the nozzle 116 may be disposed proximate and/or adjacent to a wall of the exhaust pipe 108 (e.g., proximate and/or adjacent to a wall forming the inner passage of the exhaust pipe 108).

As discussed in detail herein, the nozzle 116 may be formed and/or otherwise configured to direct supplied reductant to impinge on and/or against an impinging surface within the nozzle 116. This process may cause the reductant to break up the into fine particles or droplets. The nozzle 116 may also be formed and/or otherwise configured to direct supplied air to mix with the reductant particles, which may further facilitate atomization of the reductant. In such examples, air and reductant may mix within the nozzle 116 to form a reductant solution. The nozzle 116 may also be configured to disperse and/or otherwise direct the reductant solution into the exhaust 104 through one or more outlets disposed at a second end 122 of the nozzle 116. In some embodiments, the outlets at the second end 122 of the nozzle 116 (or channels that feed the outlets) may be helical to further enhance mixing of air and reductant, impart a circular flow to the reductant solution exiting the nozzle 116, or vary a plume size of the reductant solution within the exhaust 104. Additionally, the second end 122 of the nozzle 116 may be oriented such that the reductant solution may disperse substantially in-line with and/or substantially in the same direction as the flow of the exhaust 104 within the exhaust pipe 108. In some examples, the reductant solution may be dispersed in a substantially conical-shaped plume and with a swirling motion about a longitudinal axis of the nozzle 116. Accordingly, when the reductant solution is dispersed into the exhaust 104, the reductant solution may react with $NO_x$ (e.g., NO and/or $NO_2$) in the exhaust 104 to form water ($H_2O$) and elemental nitrogen ($N_2$).

While only one nozzle 116 is shown coupled to the supply line 118, in some embodiments, the exhaust system 100 and/or the treatment system 102 may include more than one nozzle 116. Moreover, the exhaust system 100 and/or the treatment system 102 may include more than one supply line 118, and the exhaust system 100 may include any number of exhaust pipes 108 having one or more nozzles 116 and/or one or more supply lines 118 positioned therein. Additionally, in some examples, the nozzle(s) 116 may inject reductant solution into the exhaust 104 along a substantially straight section of the exhaust system 100 (e.g., within a substantially straight section of the exhaust pipe 108) to improve mixing of the reductant solution with the exhaust 104 and/or to increase the level of reaction between the reductant solution and $NO_x$ in the exhaust 104.

In some embodiments, the nozzle 116 may be located downstream from a selective catalytic reduction (SCR) system within the exhaust system 100 and/or other treatment systems. Further, the exhaust system 100 and/or treatment system 102 may include one or more oxidation catalysts, mixing features, particulate filters (e.g., diesel particulate filter (DPF)), SCR substrates, ammonia reduction catalysts, and other devices configured to further enhance the effectiveness of reducing $NO_X$.

FIG. 2 illustrates a top perspective view of the nozzle 116. As shown in FIG. 2, in some examples the first end 120 of the nozzle 116 may be cylindrically-shaped while the second end 122 of the nozzle 116 is conically-shaped. In other examples, the first end 120 of the nozzle 116 may be cylindrically-shaped while the second end 122 of the nozzle 116 may be dome-shaped. Additionally, an exterior surface 200 of the nozzle 116 may extend between the first end 120 and the second end 122. The exterior surface 200 of the nozzle 116 may be a continuous smooth surface with rounded corners and edges to potentially reduce drag and/or turbulence as the exhaust 104 passes over the nozzle 116.

The second end 122 of the nozzle 116 may include one or more spray channel outlets 202 for dispersing the reductant solution into the exhaust 104. The spray channel outlets 202 may be formed on the exterior surface 200 of the nozzle 116. In some embodiments, the spray channel outlets 202 may be evenly distributed about a longitudinal axis 204 of the nozzle 116. As will be described below, the nozzle 116 may include respective flow passages and/or other channels (shown in FIGS. 11 and 12) to direct the reductant solution from an interior cavity of the nozzle 116 to one or more of the spray channel outlets 202.

FIG. 3 illustrates a bottom perspective view of the nozzle 116. The first end 120 of the nozzle 116 may include an air channel inlet 300 that is configured to receive air from the supply line 118 and a reductant channel inlet 302, that is separate from the air channel inlet 300, and that is configured to receive reductant from the supply line 118. As shown, the air channel inlet 300 and the reductant channel inlet 302 may be substantially annular fluid inlets defined by the nozzle 116. For example, the air channel inlet 300 may extend substantially around the reductant channel inlet 302 and may resemble a ring or annulus that encircles (e.g., is concentric with) the reductant channel inlet 302. The reductant channel inlet 302 may be substantially centrally located within the nozzle 116, and may be substantially concentric with the longitudinal axis 204 of the nozzle 116.

In such examples, the air channel inlet 300 may be fluidly connected to an air channel 304 defined by the nozzle 116. The air channel inlet 300 may be configured to supply the air channel 304 with air received from the supply line 118. Further, the reductant channel inlet 302 may be fluidly connected to a reductant channel 306 defined by the nozzle 116. In such examples, the reductant channel inlet 302 may be configured to supply the reductant channel 306 with reductant received from the supply line 118. In example embodiments, the air channel 304 and/or the reductant channel 306 may extend from the first end 120 of the nozzle 116 towards the second end 122 of the nozzle 116 to direct air and reductant into an interior cavity of the nozzle 116, respectively. Within the interior cavity, the air and the reductant may mix to form a reductant solution, and the reductant solution may be directed to exit the second end 122 of the nozzle 116 through the one or more spray channel outlets 202. Additionally, the first end 120 of the nozzle 116 may be configured to couple the nozzle 116 to the supply line 118 via threads included in the first end 120, via a snap fit, via a compression fitting, and/or via one or more of the couplers described above.

Figure 4:
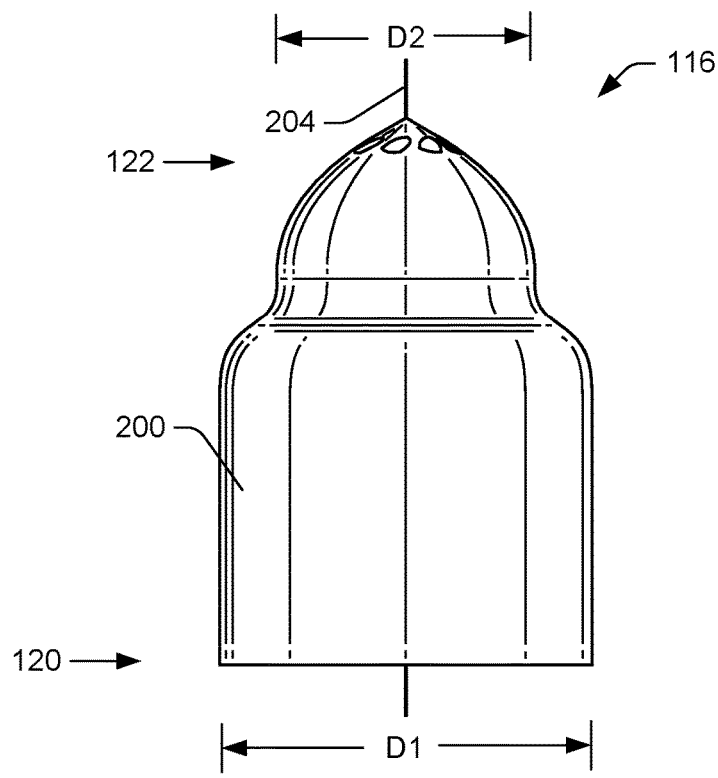
FIG. 4 is a side view of the nozzle of FIG. 1 in accordance with an example embodiment of the present disclosure.

FIG. 4 illustrates a side view of the nozzle 116. As shown, the nozzle 116 may be substantially symmetrical about the longitudinal axis 204 of the nozzle 116. As discussed above, the first end 120 the nozzle 116 may be substantially cylindrically-shaped and the second end 122 of the nozzle 116 may be substantially conical, substantially frustoconical, substantially domed-shaped, and/or any other configuration. A dimension (e.g., a width or diameter) of the nozzle 116 may reduce in size from the first end 120 of the nozzle 116 to the second end 122 of the nozzle 116. For instance, the first end 120 of the nozzle 116 may have a first diameter or cross-sectional distance (D1) that may be greater than a second diameter or cross-sectional distance (D2) at the second end 122 of the nozzle 116. The exterior surface 200 of the nozzle 116 may smoothly transition between the first diameter D1 and the second diameter D2 (vice versa) to form a continuous surface.

Figure 5:
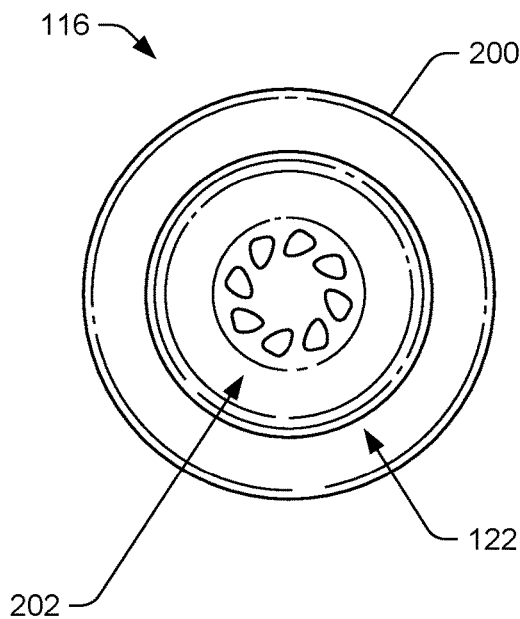
FIG. 5 is a top view of the nozzle of FIG. 1 in accordance with an example embodiment of the present disclosure.

FIG. 5 illustrates a top view of the nozzle 116. The second end 122 of the nozzle 116 may include the spray channel outlets 202 for dispersing the reductant solution into the exhaust 104. The spray channel outlets 202 may include a plurality of cross-sectional shapes or dimensions. For example, the spray channel outlets 202 may be substantially conical, substantially circular, substantially trapezoidal, substantially square, substantially rectangular, substantially ovular, and/or any other shape. In some example embodiments, the spray channel outlets 202, or the channels that supply the reductant solution to the spray channel outlets 202, may be helical and/or oriented in an outward direction away from the exterior surface 200 at the second end 122 of the nozzle 116. That is, in some examples, the spray channel outlets 202 and/or the spray channels may be angled and/or otherwise configured to direct the reductant solution away from the longitudinal axis 204 (FIG. 2) of the nozzle 116. Such a configuration may assist in dispersing the reductant solution within the exhaust 104 (FIG. 1), mixing the air and reductant within the nozzle 116, and/or adjusting a size of a plume dispersed by the nozzle 116. Additionally, the helical nature of the channels may cause the reductant solution to exit the nozzle 116 in a swirling motion about the longitudinal axis 204 of the nozzle 116.

In some examples, the spray channel outlets 202 may be substantially evenly distributed and/or radially-spaced around the second end 122 and about the longitudinal axis 204 of the nozzle 116. Additionally, individual spray channel outlets 202 may be diametrically opposed from one another such that the reductant solution may uniformly disperse into the exhaust 104. Further, while FIG. 5 illustrates eight spray channel outlets 202, the nozzle 116 may include more than or less than eight spray channel outlets 202. For instance, the nozzle 116 may include twelve spray channel outlets 202 or four spray channel outlets 202.

Figure 6:
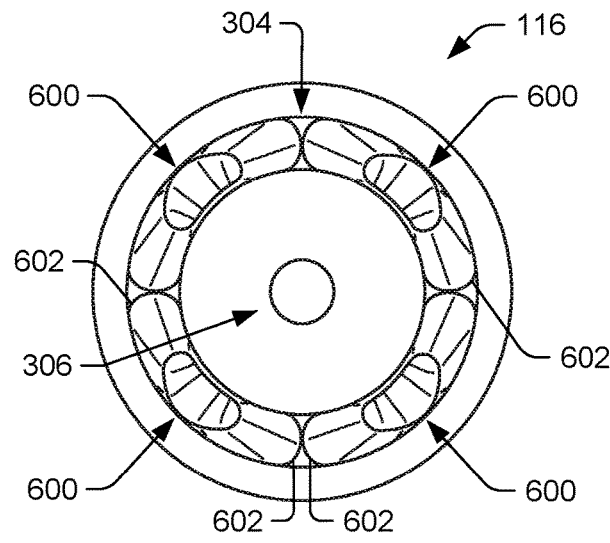
FIG. 6 is a bottom view of the nozzle of FIG. 1 in accordance with an example embodiment of the present disclosure.

FIG. 6 illustrates a bottom view of the nozzle 116. As shown in FIG. 6, in some examples the air channel 304 may diverge, branch, or otherwise split into multiple air passageways 600 defined by the nozzle 116, such as four air passageways 600. That is, while FIG. 2 illustrates the air channel 304 including a substantially cylindrical shape, the air channel 304 may extend into the nozzle 116 in the direction of the longitudinal axis 204 for a predetermined length, and may branch into the various respective air passageways 600 defined by the nozzle 116. Each of the air passageways 600 may include a corresponding air passageway inlet 602 defined by the nozzle 116 and configured to receive air from the air channel 304. In some example embodiments, the air passageways 600 and the air passageway inlets 602 may be evenly distributed around the longitudinal axis 204 of the nozzle 116 such that the air passageways 600 may be substantially diametrically opposed from one another.

As shown in FIG. 6, one or more of the air passageways 600 may include a cross-sectional area at the air passageway inlet 602 that may resemble a substantially curved and/or substantially ovular shape. As the air passageways 600 advance radially inwardly towards the interior cavity, in a direction toward the second end 122 of the nozzle 116, one or more of the air passageways 600 may taper (e.g., may decrease in diameter) to a respective air passageway outlet. Additionally, the air passageways 600 may be curved, tapered, chamfered, frustoconical, and/or any combination thereof.

The air passageways 600 may be configured to direct air, received via the air passageway inlets 602, towards the interior cavity of the nozzle 116, where the air may be directed towards the reductant. Additionally, because a cross-sectional area of the air passageways 600 reduces in size as the air passageways 600 advances towards the interior cavity 600, a velocity of air passing through the respective air passageways 600 may increase as the air approaches the second end 122 of the nozzle 116. Accordingly, when injected into the interior cavity, the air may break up the reductant at an increased velocity to increase an atomization of the reductant. In some embodiments, each of the air passageways 600 may comprise a similar size and shape compared to one another such that the air passageways 600 each receive a substantially equal amount of air from the air channel 304. In turn, by having a similar size and/or shape, the air supplied by each of the air passageways 600 may uniformly mix with the reductant, potentially leading to a substantially uniform atomization within the interior cavity of the nozzle 116. Further, although FIG. 6 illustrates the example air channel 304 branching into four air passageways 600, the nozzle 116 may include more than or less than four air passageways 600. For instance, in some examples the nozzle 116 may include greater than or less than twelve air passageways 600.

Figure 7:
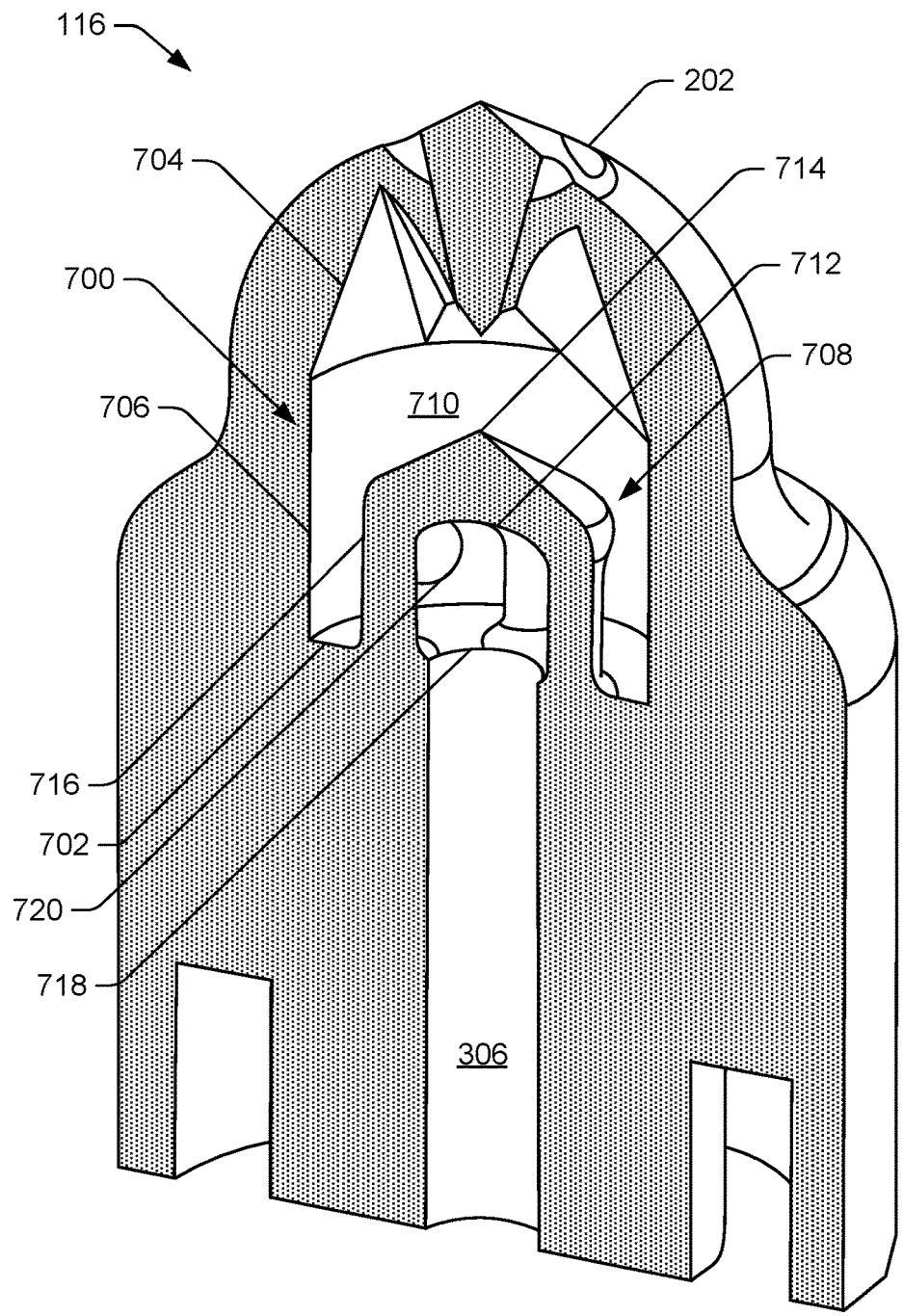
FIG. 7 is a first cross-sectional view of the nozzle of FIG. 1 in accordance with an example embodiment of the present disclosure.

FIG. 7 illustrates a cross-sectional view of the nozzle 116 taken along an X-Y plane, and as viewed from an off-perpendicular angle relative to the X-Y plane. As shown in FIG. 7, the nozzle 116 may include an interior cavity 700 disposed interior to the exterior surface 200 of the nozzle 116. As shown, the interior cavity 700 may be disposed between the first end 120 and the second end 122 of the nozzle 116, but in some instances, may be disposed closer to the second end 122 than the first end 120 of the nozzle 116.

The interior cavity 700 may be formed by the nozzle 116, and may be defined by a bottom end 702, a top end 704, and a sidewall 706 formed by the nozzle 116. In such examples, the sidewall 706 may extend from the bottom end 702 to the top end 704 of the interior cavity 700. In some examples, the interior cavity 700 may include a structure 708 and a chamber 710. For instance, the structure 708 may be substantially centrally located within the interior cavity 700, and the structure 708 may be substantially centrally aligned with the longitudinal axis 204 of the nozzle 116. In some instances, the structure 708 may extend from the bottom end 702 of the interior cavity 700 towards the top end 704 of the interior cavity 700. However, in some embodiments, the structure 708 may extend from the top end 704 or the sidewall 706 of the interior cavity 700.

As shown in FIG. 7, in some examples the structure 708 may include a first side having impinging surface 712, and a second side opposite the first side having a substantially conical top 714. In some examples, the impinging surface 712 may be substantially concave and may include a substantially conical surface, a substantially semi-spherical surface, and/or a combination thereof. In some examples, the impinging surface 712 may be oriented at an acute included angle equal to approximately 15 degrees, approximately 30 degrees, approximately 45 degrees, and/or any other value relative to an axis or plane extending perpendicular to the longitudinal axis 204 of the nozzle 116.

The structure 708 may further include one or more columns, posts, or legs 716 that extend from the first side of the structure 708, adjacent to the impinging surface 712. The legs 716 may offset or support the impinging surface 712 of the structure 708 above or opposite the reductant channel 306. For example, the legs 716 may couple the structure 708 to the bottom end 702, the top end 704, and/or the sidewall 706 to support the impinging surface 712 from the bottom end 702 of the interior cavity 700 or away from a reductant channel outlet 718 at any desired distance. In some embodiments, the structure 708 may include four legs 716 that are substantially equally spaced around the reductant channel 306 (i.e., spaced approximately 90 degrees apart). However, in some embodiments the structure 708 may include more than or less than four legs 712. For example, the structure 708 may include three legs 716. Additionally, gaps or spaces may be disposed between adjacent legs 716.

In some example embodiments, a centerline of the reductant channel 306 may align with a center point (or centerline) of the impinging surface 712 of the structure 708. In such examples, the longitudinal axis 204 of the nozzle 116 may pass substantially centrally through the impinging surface 712 and through the reductant channel 306. Additionally, in some embodiments, the impinging surface 712 may include a similar width as the reductant channel 306. However, in some embodiments, the width of the impinging surface 712 may be larger than the width of the reductant channel 306 to account for any expansion of the reductant exiting the reductant outlet 718.

As discussed above, the nozzle 116 may include one or more air passageways 600 that terminate in outlets within the interior cavity 700. For example, each of the air passageways 600 may include a respective air passageway inlet 602 and a corresponding air passageway outlet 720 that disperses air into the interior cavity 700. In some embodiments, the air passageways 600 may terminate at the sidewall 706 of the interior cavity 700 and form the air passageway outlets 720 that discharge air into the interior cavity 700.

In some embodiments, an orientation of the air passageway outlets 720 may be substantially perpendicular to the reductant channel 306 and/or the reductant channel outlet 718. In other words, the reductant may enter the interior cavity 700 substantially axially and along the longitudinal axis 204 of the nozzle 116, while the air enters the interior cavity 700 radially or substantially perpendicular to the longitudinal axis 204 of the nozzle 116. Additionally, the air passageway outlets 720 may be substantially equally spaced around a perimeter of the interior cavity 700.

The top end 704 of the interior cavity 700 may converge (e.g., having a smaller diameter than the bottom end 702) to guide and accelerate the reductant solution to the spray channel outlets 202. That is, the top end 704 may converge towards the longitudinal axis 204 of the nozzle 116. Discussed in detail herein, channels may funnel the reductant solution from the chamber 710 to the spray channel outlets 202.

As discussed above, the legs 716 may support the impinging surface 712 from the bottom end 702 of the interior cavity 700 to allow the reductant to disperse from underneath the structure 708. Further, in instances where the structure 708 includes more than one leg, a gap may separate the adjacent legs 716. In some embodiments, the air passageway outlets 720 may be configured and oriented to disperse air towards the gap disposed between adjacent legs 716. In some embodiments, each air passageway outlet 720 may be disposed opposite to a respective gap between the legs 716 and/or oriented towards the gap. As such, the air passageway outlets 720 may be positioned and/or oriented to inject air into the interior cavity 700 at a location where the reductant exits from underneath the structure 708. In other words, the gaps interposed between adjacent legs 716 may permit the reductant to radially disperse towards the sidewall 706, where the reductant may mix with the air.

A shape of the legs 716 and/or a location of the legs 716 within the interior cavity 700 may minimize an interference with the reductant as it passes from the reductant channel 306 toward the sidewall 706. For example, the legs 716 may include curved exterior surfaces, thin profiles, and/or cross-section. Additionally, the legs 716 may include exterior features that may induce a swirling motion into the atomized reductant.

Additionally, the nozzle 116 may include more than four air passageways 600 and associated air passageway outlets 720. Increasing the number of air passageways 600 may increase the amount of air injected into the interior cavity 700, which may lead to an increased atomization of the reductant. The number of the air passageways 600 may depend on an operational environment of the nozzle 116. For example, in applications where the flow rate or volume of exhaust 104 is high, including more air passageways 600 may increase the atomization of the reductant and/or compensate for an increased flow rate of reductant.

Figure 8:
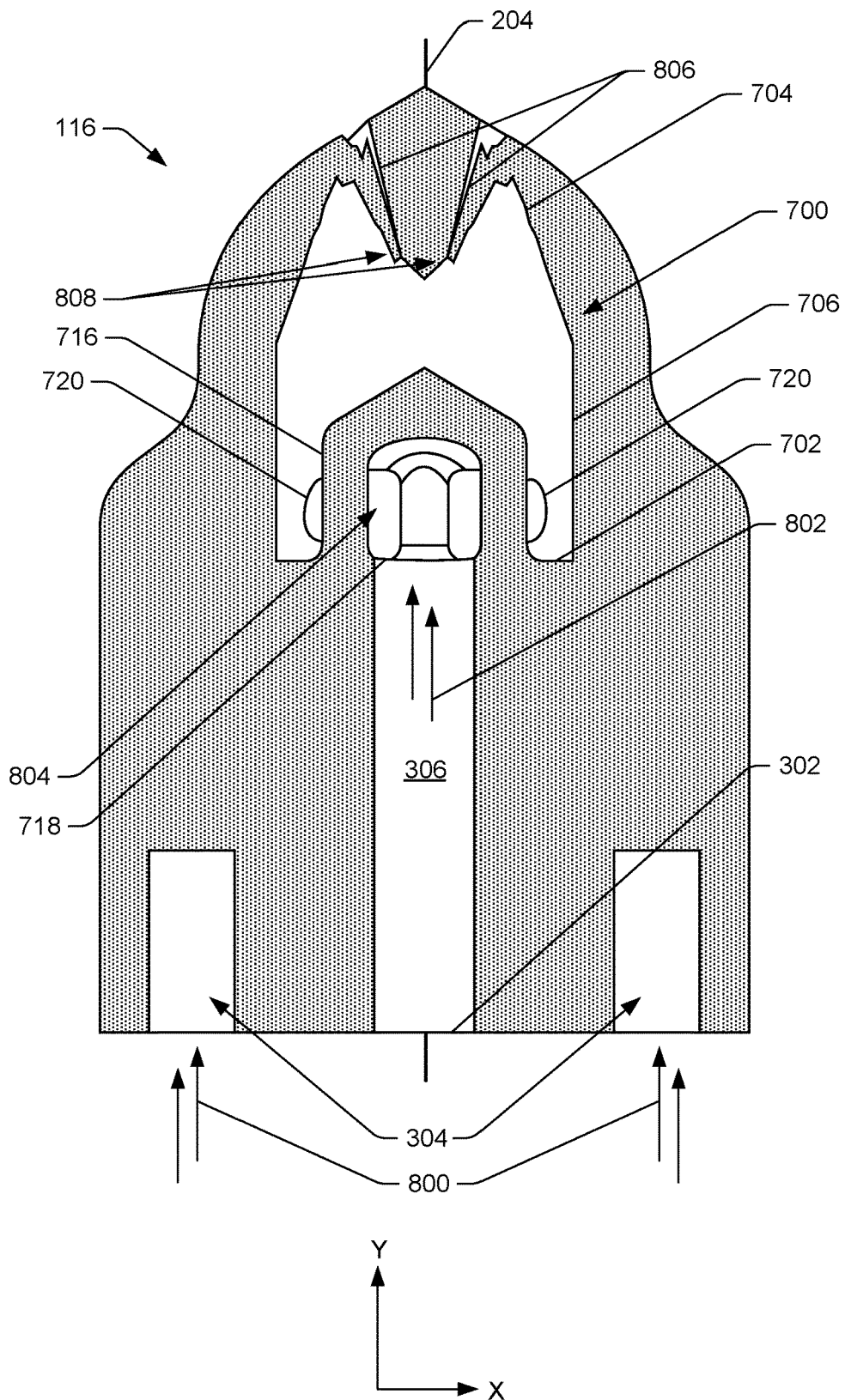
FIG. 8 is a second cross-sectional view of the nozzle of FIG. 1 in accordance with an example embodiment of the present disclosure.

FIG. 8 illustrates a cross-sectional view of the nozzle 116 taken along an X-Y plane, and as viewed perpendicular to the X-Y plane. FIG. 8 illustrates that the bottom end 702 or a first portion of the interior cavity 700 may be cylindrical, while the top end 704 may include a smaller cross-sectional diameter relative to the bottom end 702, and may converge to a conical shape. Accordingly, the sidewall 706 may taper inward from the bottom end 702 to the top end 704, or as the interior cavity 700 advances radially inwardly from the first end 120 of the nozzle 116 towards the second end 122 of the nozzle 116. The tapering of the interior cavity 700 may impart a swirling motion into the reductant solution to further atomize the reductant.

Figure 10:
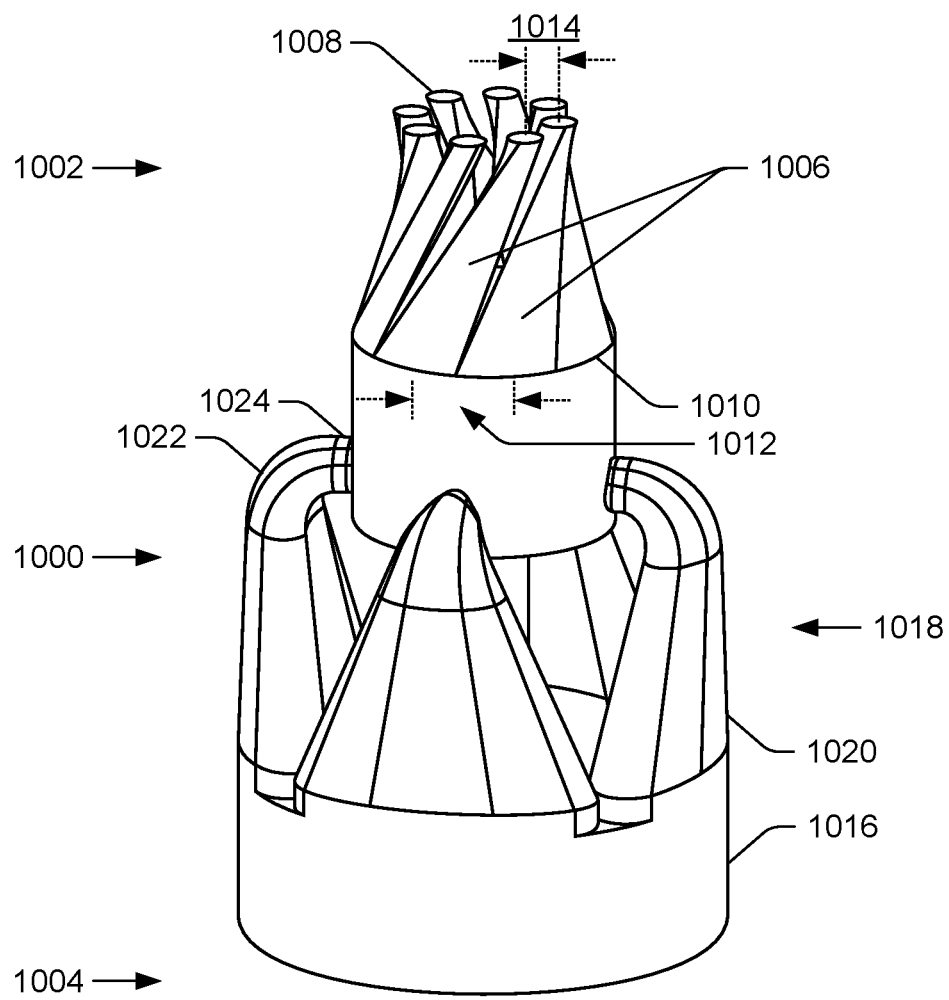
FIG. 10 is a perspective view of a negative space within the nozzle of FIG. 1 in accordance with an example embodiment of the present disclosure.

In such examples, the air channel 304 may extend substantially parallel to the longitudinal axis 204 of the nozzle 116, and may diverge into the air passageways 600 (discussed in more detail in FIG. 10). The air channel 304 may be configured to receive air, as shown by the arrows 800, via the supply line 118. The reductant channel 306 may supply the reductant into the interior cavity 700. The reductant channel 718 may be centrally located within the nozzle 116 and may be disposed between the reductant inlet 302 and a reductant channel outlet 718. As shown, the reductant channel 306 may be substantially cylindrical, and may have a substantially constant diameter. As indicated by the arrows 802, the reductant may be supplied along the longitudinal axis 204 of the nozzle 116.

The air passageway outlets 720 may be disposed at the sidewall 706 of the interior cavity 700 and may be oriented towards a center of the interior cavity 700, or towards the longitudinal axis 204, for mixing with the reductant. In some examples, the air passageway outlets 720 or a cross section of the air passageway outlets 720 may include a variety of shapes, such as being substantially circular, substantially ovular, and/or any other shape. FIG. 8 further illustrates that the air passageway outlets 720 and the legs 716 may be out of phase with one another by 90 degrees. That is, by offsetting the air passageway outlets 720 and the legs 716, vice versa, the air dispersed from the air passageways 600 may be oriented towards a gap 804 interposed between adjacent legs 716.

The top end 704 of the interior cavity 700 may include spray channels 806. As discussed above, the spray channels 806 may be disposed between the spray channel outlets 202 and the interior cavity 700 to route the reductant solution into the exhaust 104. The spray channels 806 may receive the reductant solution at spray channel inlets 808 disposed at the top end 704 of the interior cavity 700.

Figure 9:
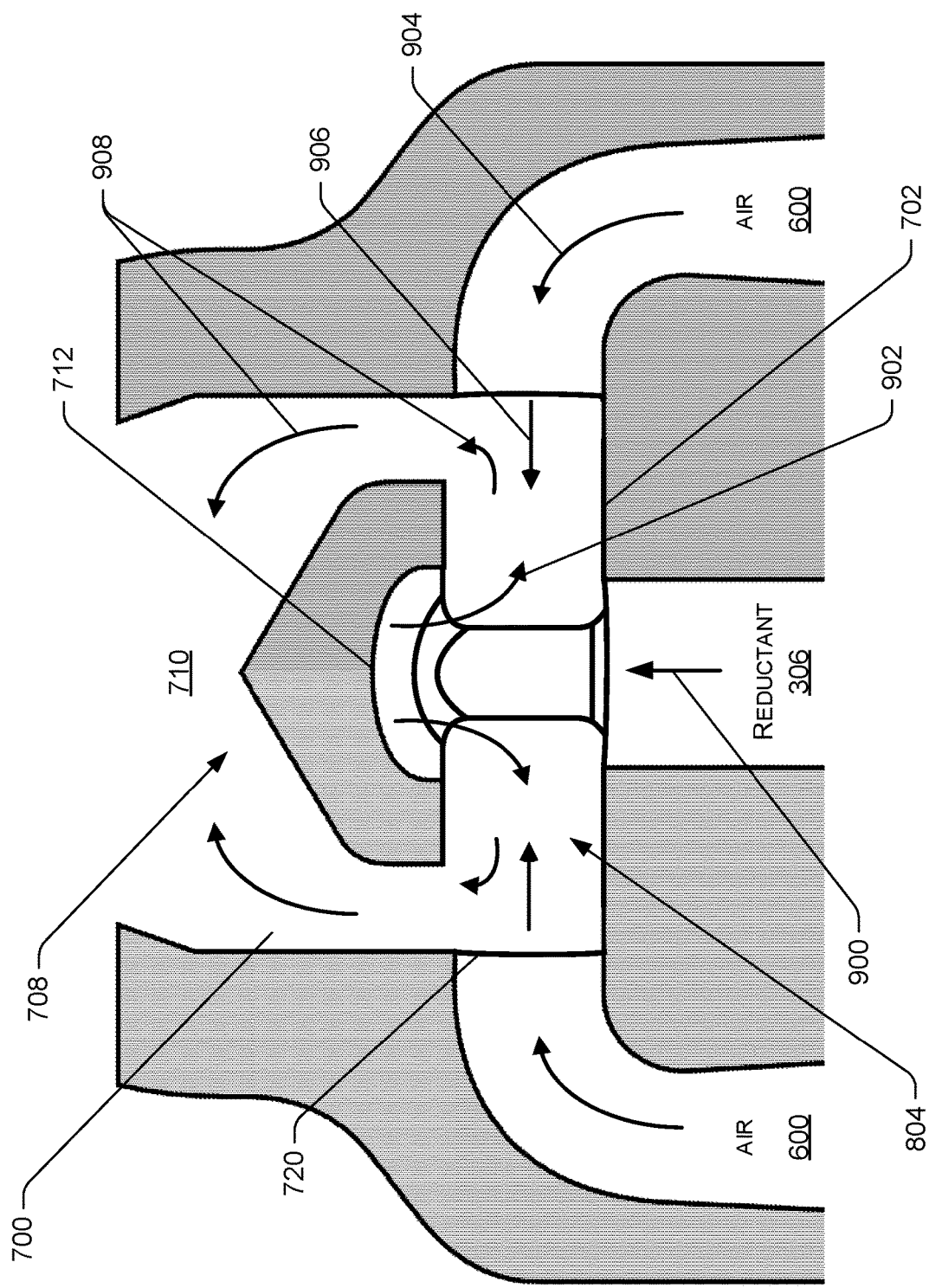
FIG. 9 is a cross-sectional view of an interior cavity of the nozzle of FIG. 1, showing directional flows of air and reductant in accordance with an example embodiment of the present disclosure.

FIG. 9 illustrates a cross-sectional view of the nozzle 116, showing a flow pattern of the reductant and air within the interior cavity 700. The cross-sectional view in FIG. 9 is shown through two of the air passageways 600. As illustrated in FIG. 9, the reductant channel 306 may direct reductant, as shown by arrow 900, into the interior cavity 700, where the reductant may impact the impinging surface 712 of the structure 708. The concave nature of the impinging surface 712 may assist in increasing the rate of atomization of the reductant. That is, through contacting, impinging, or otherwise impacting the concave impinging surface 712, the reductant may break-up into relatively small particles. As a result of contacting the impinging surface 712 of the structure 708 the reductant may radially disperse away from the longitudinal axis 204 of the nozzle 116, towards sidewall 706 of the interior cavity 700, and/or towards the air passageway outlets 720, as shown by arrow 902. Noted above, and as shown in FIG. 9, impacting the impinging surface 712 radially disperses the reductant from beneath the structure 708 via the gap 804 interposed between adjacent legs 716.

The air passageways 600 may be disposed around the reductant channel 306 and may direct the air towards the interior cavity 700 (or longitudinal axis 204), as shown by arrow 904, and air passing through the air passageways 600 may exit the air passageways 600 via the air passageway outlets 720 into the interior cavity 700, as shown by arrow 906. Further, the concave geometry of the impinging surface 710 may substantially uniformly disperse the reductant into the interior cavity 700 as the reductant impinges the impinging surface 712. This substantially uniform dispersion may allow for the air to evenly mix with the reductant. As the air passageway outlets 720 may be radially dispersed about the interior cavity 700, the air may mix with the reductant from multiple directions. Accordingly, at a first instance, the reductant may impinge the impinging surface 712 and radially disperse outward towards the sidewall 706 of the interior cavity 700, and at a second instance, the air discharged from the air passageways 600 may mix with the reductant.

The radial injection of the air, and the mixing of the air with the reductant, may direct or funnel the reductant solution towards the top end 704 of the interior cavity 700 and/or the chamber 710. Within the chamber 710, the air and reductant may mix to form the reductant solution. Additionally, the nature of the conical top of the structure 708 may provide a desired swirling flow pattern or effect within the chamber 710. The swirling may further assist in mixing the reductant solution and/or further atomizing the reductant. Additionally, the chamber 710 may permit the reductant solution to expand and potentially reduce a crystallization of the reductant solution. This expansion may minimize or eliminate clogging of the spray channel outlets 202.

Further, air may exit the air passageway outlets 720 at a plurality of angles or directions. For example, the air may be injected in a direction towards the center of the interior cavity 700 or the air passageway outlets 720 may be angled towards the sidewall 706 to induce a swirling motion within the interior cavity 700. Additionally, although FIG. 9 illustrates that the air passageway outlets 720 may be flush with and/or adjacent to the bottom end 702 of the interior cavity 700, in some examples, the air passageway outlets 720 may be spaced above from the bottom end 702 of the interior cavity 700. For instance, the air passageway outlets 720 may be centrally disposed between the bottom end 702 and the impinging surface 712 to radially mix with the reductant. In mixing with the air, the reductant solution may funnel towards the chamber 710, as shown by arrows 908. In the chamber 710, the reductant solution may further mix and exit the nozzle 116.

FIG. 10 illustrates a perspective view of a negative space 1000 corresponding to the nozzle 116. The negative space 1000 represents a void, or void space, associated with forming the nozzle 116 of the present disclosure in a three-dimensional ("3D") printing process or other manufacturing process. For example, the various components of the negative space 1000 illustrated in FIG. 10 may be representative of the air passageways 600, the interior cavity 700, and/or other flow channels/passageways of the nozzle 116 formed in an example 3D printing process.

The negative space 1000 may be defined by a top 1002, which may correspond to the second end 122 of the nozzle 116, and a bottom 1004, which may correspond to the first end 120 of the nozzle 116. Further, the negative space 1000 may include a spray channel void space 1006 corresponding to the channels 806 of the nozzle 116. The spray channel void space 1006 may include a spray channel outlet void space 1008, which may correspond to the spray channel outlets 202, and a spray channel inlet void space 1010, which may correspond to the spray channel inlets 808. In some example embodiments, the spray channel void space 1006 may be helical or spiraled about the longitudinal axis 204 of the nozzle 116. With such a configuration, as the spray channels 806 extend from the spray nozzle inlets 808 towards the spray channel outlets 202, the spray channels 806 may spiral about the longitudinal axis 204 of the nozzle 116. In some embodiments, because the spray channels 806 spiral towards the second end 122 of the nozzle 116, FIG. 10 illustrates that the spray channel void space 1006 may converge towards the top 1002 of the void space 1000. Stated alternatively, at the top 1002 of the void space 1000, a distance 1012 extending from a center point of a first spray channel inlet void space 1010 to a center point of a second spray channel inlet void space 1010 adjacent to the first spray channel inlet void space 1010 may be greater than a distance 1014 extending from a center point of the first spray channel outlet void space 1008 to a center point of the second spray channel outlet void space 1008 adjacent to the first spray channel outlet void space 1008.

The spray channel void space 1006 may also taper along a length of the spray channel void space 1006, between the spray channel inlet void space 1010 and the spray channel outlet void space 1008. For instance, the spray channel void space 1006 may include a first cross-sectional area at the spray channel inlet void space 1010 and a second cross-sectional area at the spray channel outlet void space 1008 that may be less than the first-cross sectional area. Additionally, a cross-sectional shape of the spray channel inlet void space 1010 may be different than a cross-sectional shape of the spray channel outlet void space 1008. For instance, the spray channel inlet void space 1010 may include a trapezoidal shape while the spray channel outlet void space 1012 may include a circular shape.

The spray channel void space 1006 forms spray channels 806 having a spiral nature, which may assist in imparting a fluid twist to the reductant solution and may further mix the reductant solution within the exhaust pipe 108. In an embodiment, the swirling effect of the reductant solution may create a plume of reductant solution large enough to extend to an outer periphery of the exhaust pipe 108, for instance, and may assist in conically spraying the reductant solution into the exhaust 104. In some embodiments, the angle at which the spray channel outlets 202 are oriented from the longitudinal axis 204 of the nozzle 116 may adjust a plume size or swirling motion of the reductant solution. For instance, depending on the application of the nozzle 116, the spray channel void space 1006 and/or the spray channel outlet void space 1008 may be adjusted to create a narrow plume or a wide plume. Additionally, the reduction in cross-sectional area of the spray channel 806 may impart velocity into the reductant solution as the reductant solution passes from the spray channel inlets 808 and exit the spray channel outlets 202. The increased velocity may enhance mixing, atomization, and/or dispersion of the reductant solution.

Located at the bottom 1004 of the negative space 1000 may be the air channel void space 1016, which may correspond to the air channel 304. As discussed above, in some examples the air channel 304 may branch into the air passageways 600, including four air passageways 600 that direct the air into the interior cavity 700. Accordingly, the negative space 1000 may include air passageway void space 1018. For example, the air passageways void space 1018 may include a first portion 1020, a second portion 1022, and a third portion 1024.

Each of the air passageway void space 1018 may branch from the air channel void space 1016 to receive air. As the air passageway void space 1018 advance from the first portion 1020 towards the second portion 1022, the air passageway void space 1018 may taper inward and reduce in cross-sectional area. As shown in FIG. 10, the air passageway void space 1018, and particularly the first portion 1020, may taper in multiple directions. As the air passageway void space 1018 approaches the interior cavity 700 of the nozzle 116, the air passageway void space 1018 may curve at the second void space 1022. Therein, the third portion 1024 of the air passageway void space 1018 may extend inwardly and towards the interior cavity 700.

In other words, the reductant channel void space 1018 may form the air channel 304 that is substantially parallel with the longitudinal axis 204 of the nozzle 116. Therein, the air may pass from the air channel 304 to the air passageways 600. The first portion 1020 may be substantially parallel to the longitudinal axis 204 and taper as the first portion 1020 advances towards the second portion 1022 of the air passageway void space 1018. The second portion 1022 of air passageway void space 1018 may curve towards the longitudinal axis 204 of the nozzle 116. The third portion 1024 of the air passageway void space 1018 may be substantially perpendicular to the longitudinal axis 204. Accordingly, due to the configurations of the air channel void space 1016 and the air passageway void space 1018, in some example embodiments, the air passageways 600 and/or the air passageway outlets 720 may be configured to direct air into the interior cavity 700 in a direction substantially perpendicular to the longitudinal axis 204 and/or substantially perpendicular to the flow direction of injected reductant entering the interior cavity 700 from the reductant channel 306 (as shown in FIG. 9). In such examples, the reductant channel outlet 718 and the air passageway outlets 720 may be substantially perpendicular to one another.

Figure 11:
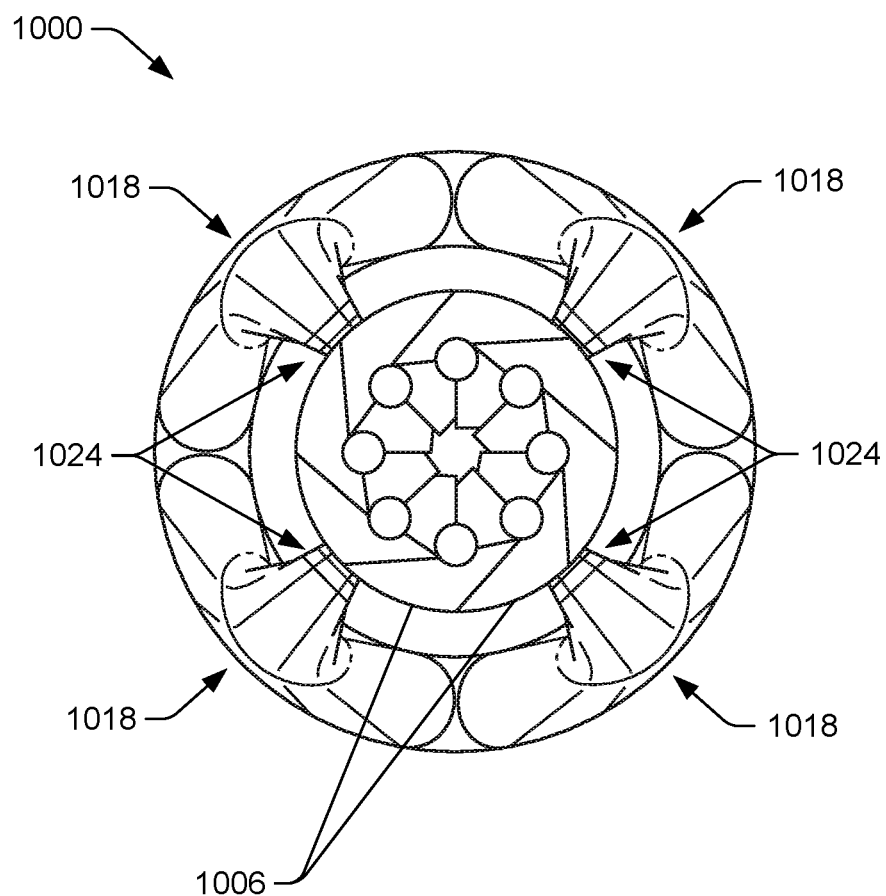
FIG. 11 is a top view of the negative space within the nozzle of FIG. 1 in accordance with an example embodiment of the present disclosure.

FIG. 11 illustrates a top view of the negative space 1000 of the nozzle 116. In FIG. 11, each of the air passageway void space 1018 is shown oriented towards the longitudinal axis 204 of the nozzle 116 to disperse air within the interior cavity 700 at different directions. More particularly, the third portion 1024 of respective air passageway void spaces 1018 may be substantially diametrically opposed from one another such that air directed by the respective air passageways 600 radially mixes with the reductant at different directions. Additionally, each of the air passageway void space 1018 may be substantially similar in size to substantially uniformly disperse the air within the interior cavity 700.

As also illustrated in FIG. 11, the spray channel void space 1006 may follow a trajectory that rotates about the longitudinal axis 204 of the nozzle 116. Each spray channel 806 may include a corresponding spray channel void space 1006 having a respective central longitudinal axis (not shown) extending from the spray channel inlet void space 1010 to the spray channel outlet void space 1008. Additionally, the diameter, circumference, or cross-section of the spray channel void space 1006, as measured in plane perpendicular to the longitudinal axis of the spray channel void space 1006, may decrease from the spray channel inlet void space 1010 to the spray channel outlet void space 1008.

Figure 12:
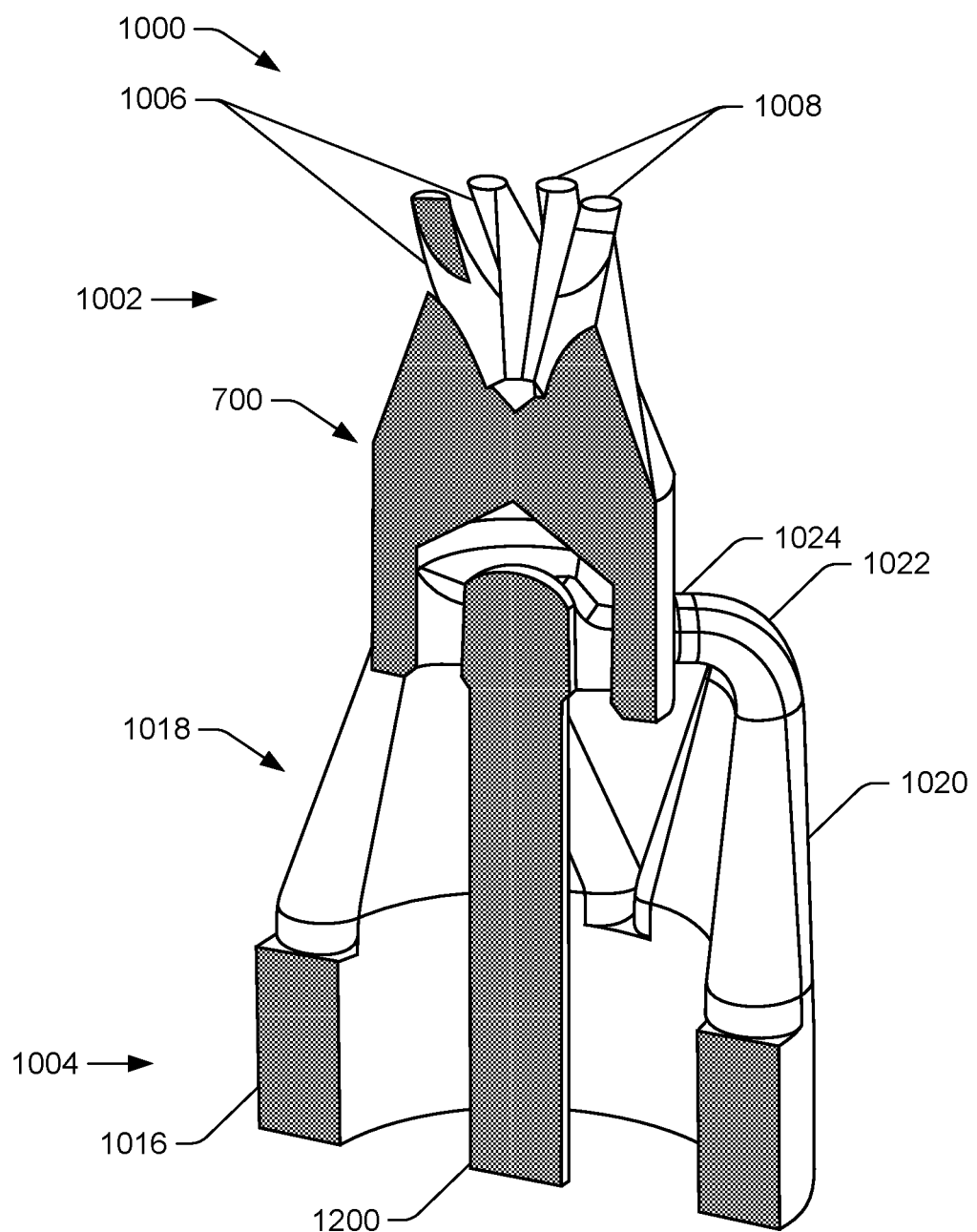
FIG. 12 is a cross-sectional view of the negative space of FIG. 11 in accordance with an example embodiment of the present disclosure.

FIG. 12 illustrates a cross-sectional view of the negative space 1000 of the nozzle 116, taken along a X-Y plane and as viewed from an off-perpendicular angle relative to the X-Y plane. As shown in FIG. 12, the air channel void space 1016 may be configured as a substantially cylindrical orifice or annular ring. In some examples, the air channel void space 1016 may extend into the air passageway void space 1018, and in particular, may extend into the first portion 1020 of the air passageway void space 1018. FIG. 12 also illustrates that the air passageway void space 1018 may be oriented in a similar direction as a reductant channel void space 1200, which may correspond to the reductant channel 306, and may be substantially parallel to the longitudinal axis 204 of the nozzle 116. The air passageway void space 1018 may curve at or along the second portion 1022 and orient inward toward the interior cavity 700 at the third portion 1024. The third portion 1024 of the air passageway void space 1018 may extend substantially perpendicular to the longitudinal axis 204 of the nozzle 116, and may be oriented towards the interior cavity 700 of the nozzle 116. In an embodiment, the curve along the second portion 1022 may be 90 degrees such that dispersed air from each of the air passageways 600 may be oriented substantially perpendicular to the dispersed reductant exiting from the reductant channel 306. As shown at the top 1002 of the negative space 1000, the spray channel void space 1006 may follow a trajectory that spirals about the longitudinal axis 204 of the nozzle 116. In an embodiment, the spray channels 806 may angle or orient away from the longitudinal axis 204 of the nozzle 116.

Figure 13:
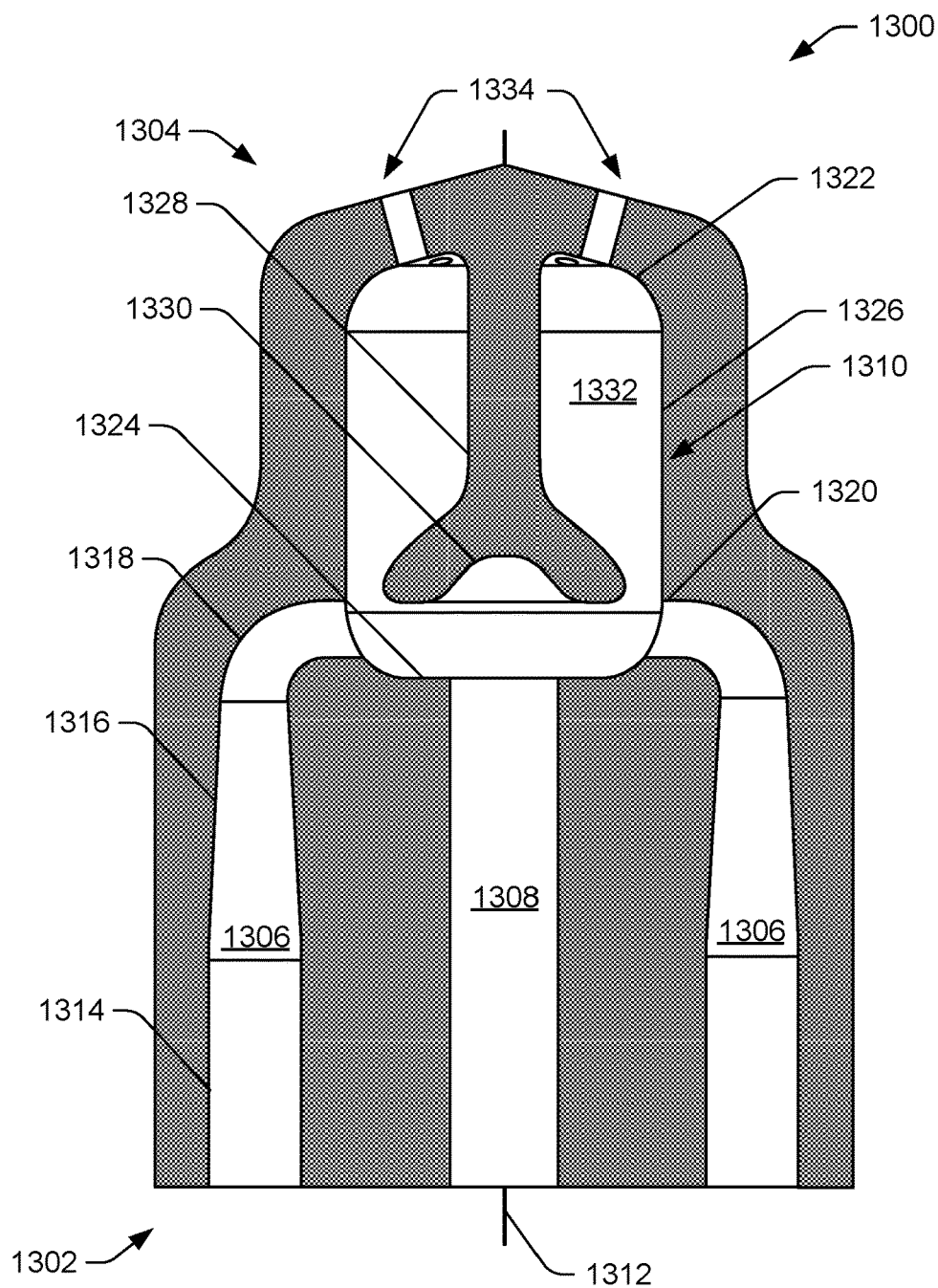
FIG. 13 is a cross-sectional view of another example nozzle in accordance with an example embodiment of the present disclosure.

FIG. 13 illustrates a cross-sectional view of another example nozzle 1300. In some embodiments, the nozzle 1300 may include similar features as the nozzle 116. The nozzle 1300 may include a first end 1302 and a second end 1304. FIG. 13 illustrates that air passageways 1306 and a reductant channel 1308 may extend from the first end 1302 of the nozzle 1300. The air passageways 1306 and the reductant channel 1308 may receive air and reductant, respectively, from the supply line 118. The air passageways 1306 and the reductant channel 1308 may respectively direct air and reductant to an interior cavity 1310 formed by the nozzle 1300.

The reductant channel 1308 may extend substantially parallel to a longitudinal axis 1312 of the nozzle 1300. In some examples, the air passageways 1306 may include four portions. For instance, a first portion 1314 of the air passageways 1306 may be substantially parallel with the longitudinal axis 1312 of the nozzle 1300. A second portion 1316 of the air passageways 1306 may fluidly connect with the first portion 1312, may be substantially parallel with the longitudinal axis 1312 of the nozzle 1300 and may taper in multiple directions, thereby reducing a cross-sectional area of the air passageway 1306. A third portion 1318 of the air passageway 1306 may fluidly connect with the second portion 1314 and curve towards the longitudinal axis 1312 of the nozzle 1300. A fourth portion 1318 of the air passageway 1306 may fluidly connect with the third portion 1316 and the interior cavity 1310 and may be substantially perpendicular to the longitudinal axis 1312 of the nozzle 1300.

The interior cavity 1310 may include a top end 1322 and a bottom end 1324 formed by the nozzle 1300. A sidewall 1326 may extend between the top end 1322 of the interior cavity 1310 and the bottom end 1324 of the interior cavity 1310 and may be formed by the nozzle 1300. In some examples, the nozzle 1300 may include a structure 1328 that may suspend from the top end 1322 of the interior cavity 1310. In some examples, the structure 1308 may extend towards the bottom end 1324 of the interior cavity 1310. Additionally, the structure 1328 may include an impinging surface 1330 disposed above the bottom end 1324 of the interior cavity 1310 and opposite the reductant channel 1308.

Similar to the discussion above with regard to the nozzle 116, reductant may exit the reductant channel 1308 and impact an impinging surface 1330 of the structure 1318 to radially disperse reductant into the interior cavity 1310. In this process, the impinging surface 1330 may atomize the reductant. That is, the impinging surface 1330 may include similar features as the impinging surface 712 to break-up and atomize the reductant. For instance, the impinging surface 1330 may include a substantially concave surface. Air may interface with the reductant through exiting the air passageways 1306. Therein, a reductant solution may advance towards a chamber 1332 for further mixing. The reductant solution may disperse through spray outlets 1334 located at the top end 1322 of the interior cavity 1310. Similar to the spray outlets 202, the spray outlets 1334 and/or channels that feed the spray outlets 1334 may follow a trajectory that spirals about the longitudinal axis 1312 of the nozzle 1300.

In some embodiments, by supporting the impinging surface 1330 with the structure 1328 shown in FIG. 13, reductant may radially disperse from the impinging surface 1330 without interference or with less interface. In such embodiments, this may cause an increase in the atomization of the reductant as air mixes with the reductant. Additionally, without the obstruction, or with minimized obstruction, reductant may substantially uniformly disperse within the interior cavity 1310 for mixing with air.

Figure 14:
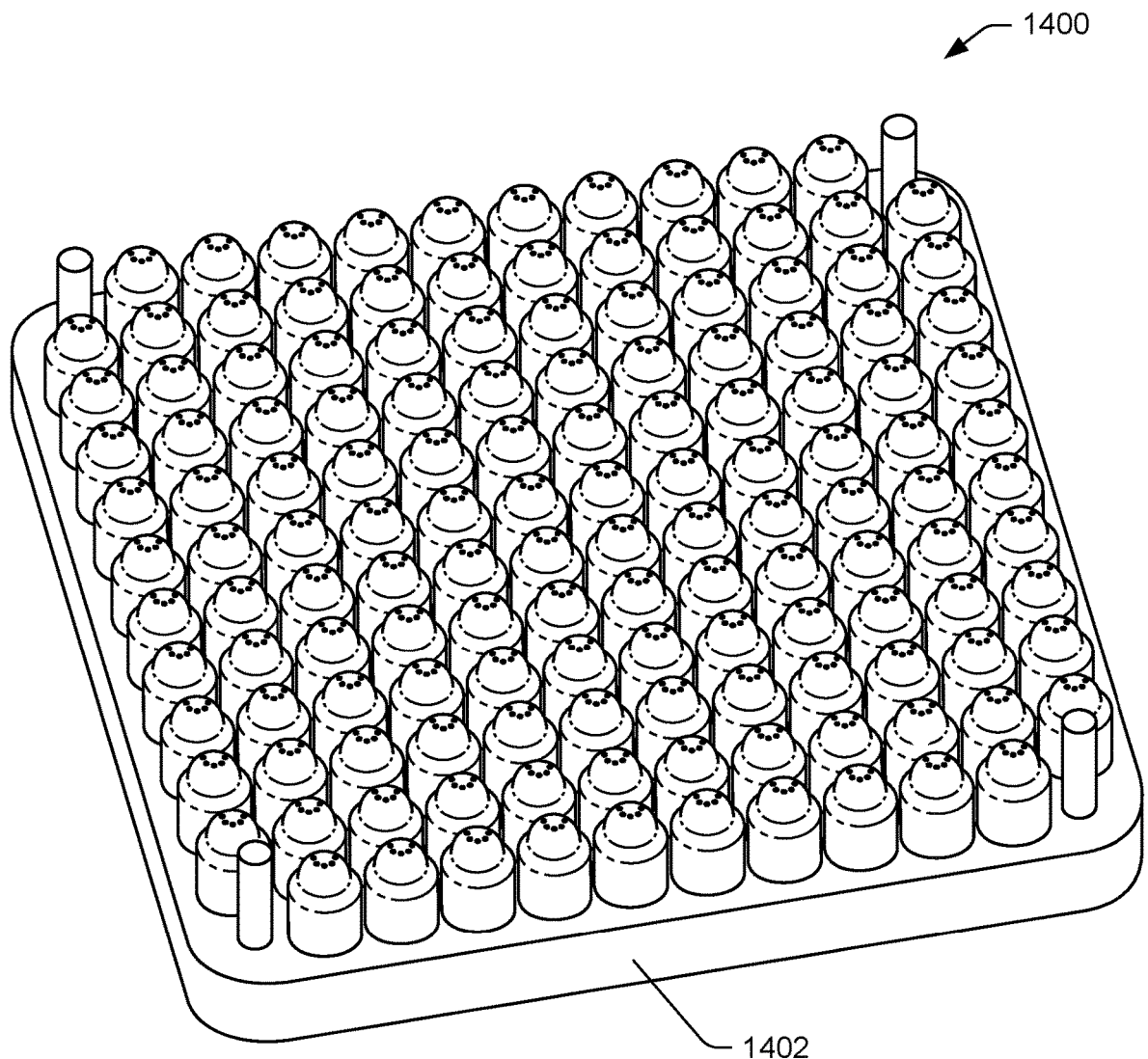
FIG. 14 is an example manufacturing technique to produce the example nozzles in accordance with an example embodiment of the present disclosure.

FIG. 14 illustrates an example manufacturing technique to produce the nozzle 116 and/or the nozzle 1300. Specifically, FIG. 14 illustrates a plurality of nozzles 1400 manufactured on a tray 1402 and using 3D printing techniques or other types of additive manufacturing (e.g., cast molding). In an embodiment, all components of the nozzle 116 and/or the nozzle 1300 are manufactured using the 3D printing techniques and more or less nozzles may be manufactured at a single instance than shown in FIG. 14. Additionally, it is contemplated, that one more of the components of the nozzles discussed above could alternatively manufactured from other processes.

INDUSTRIAL APPLICABILITY

The exhaust system of the present disclosure may be used with any power system having a treatment system to reduce the amount of harmful emissions generated from internal-combustion engines. More particularly, nozzles of the present disclosure are applicable to any liquid/gas mixing operation, where efficient, even, and thorough mixing of reductant, air, and exhaust is desired. Although applicable to a range of treatment devices/systems, the disclosed treatment system employing the nozzle may be primarily beneficial when associated with a SCR device. The disclosed nozzle assists in the reduction of $NO_x$, by effectively atomizing reductant, and dispersing a mixture of reductant and air in an exhaust gas flow of the engine.

As described above, in some examples the air channel 304 and the reductant channel 306 may receive air and reductant from the supply line 118, respectively. The air channel 304 may branch or otherwise split into multiple air passageways 600 that taper towards the interior cavity 700 of the nozzle 116, where reductant supplied by the reductant channel 306 mixes with the air within the interior cavity 700. Specifically, the reductant may impinge upon the concave impinging surface 712 to atomize the reductant. The reductant may radially disperse from the impinging surface 712 in a uniform manner. Air supplied by the air passageways 600 may mix with the dispersed reductant to further atomize the reductant. The air and reductant solution may advance into the chamber 710 within the interior cavity 700 for further mixing and disperse out of the nozzle 116 into the exhaust 104 via spray channels 806 and spray channel outlets 202. As such, the treatment processes performed within treatment system 102 may include, among other things, a conversion process of NO to $NO_2$ and/or a particulate removal process. Additionally, the nozzle 116 may increase a mixing between reductant and air and may reduce crystallization of the reductant within the nozzle 116. The nozzle 116 may also be manufactured from a single piece of material using 3D printing techniques to reduce manufacturing and/or assembly times.

It will be apparent to those skilled in the art that various modifications and variations can be made to the exhaust system of the present disclosure without departing from the scope of the disclosure. Other embodiments will be apparent to those skilled in the art from consideration of the specification and practice of the exhaust system disclosed herein. It is intended that the specification and examples be considered as exemplary only, with a true scope of the disclosure being indicated by the following claims and their equivalent.

What is claimed is:

1. A nozzle, comprising:
 a first end including a first inlet and a second inlet;
 a second end including a nozzle outlet, an exterior surface of the nozzle defining a plurality of distinct outlet apertures at the nozzle outlet;
 a first channel fluidly connected to the first inlet and extending substantially parallel to a longitudinal axis of the nozzle;
 a second channel fluidly connected to the second inlet and extending substantially parallel to the first channel;
 an interior cavity including:
  a first outlet, the first inlet being fluidly coupled to the interior cavity via the first channel and the first outlet;
  a second outlet, the second inlet being fluidly coupled to the interior cavity via the second channel and the second outlet; and
  an impinging surface spaced apart from and located opposite the second outlet along a longitudinal direction, the longitudinal direction being parallel to the longitudinal axis, the impinging surface including a concave surface that faces the second outlet along the longitudinal direction; and
 a third channel disposed between the impinging surface and the nozzle outlet along the longitudinal direction, the interior cavity being fluidly coupled with the plurality of distinct outlet apertures via the third channel.

2. The nozzle of claim 1, wherein the interior cavity further comprises:
 a bottom end;
 a top end; and
 one or more legs extending from the bottom end to the impinging surface, wherein the one or more legs support the impinging surface above the bottom end of the interior cavity.

3. The nozzle of claim 2, wherein:
 a gap is formed between adjacent legs of the one or more legs; and
 the first outlet faces the gap along a radial direction, the radial direction being transverse to the longitudinal direction.

4. The nozzle of claim 1, wherein:
 the interior cavity includes a bottom end, a top end, and a sidewall extending from the bottom end to the top end;
 the first outlet is disposed at the sidewall;
 the second outlet is disposed at the bottom end; and
 the third channel is disposed at the top end.

5. The nozzle of claim 1, wherein an orientation of the first outlet is substantially perpendicular to an orientation of the second outlet.

6. The nozzle of claim 1, wherein the impinging surface is substantially centrally located within the interior cavity.

7. The nozzle of claim 1, wherein the interior cavity further includes a structure connected to a bottom end of the interior cavity, the structure including:
a first side having the impinging surface;
one or more legs extending from the first side and coupled to the bottom end of the interior cavity; and
a second side opposite to the first side and having a conical surface.

8. A nozzle, comprising:
an interior cavity;
a structure disposed within the interior cavity, the structure including:
a bottom impinging surface, wherein at least a portion of the bottom impinging surface is concave;
one or more legs supporting the bottom impinging surface; and
a top surface located opposite the bottom impinging surface, wherein the top surface is conically-shaped;
a first channel fluidly connected to the interior cavity;
one or more second channels fluidly connected to the interior cavity, each channel of the one or more second channels extending substantially parallel to the first channel; and
one or more outlets coupled to the interior cavity,
wherein the first channel comprises at least one channel,
the one or more second channels comprises at least four channels, and
the one or more outlets comprises at least eight distinct outlets.

9. The nozzle of claim 8, wherein:
the first channel is concentric with the longitudinal axis; and
the bottom impinging surface is substantially centrally located within the interior cavity.

10. The nozzle of claim 8, wherein:
the one or more legs encircle the first channel; and
a gap is defined between adjacent legs of the one or more legs.

11. The nozzle of claim 8, wherein:
the interior cavity includes a bottom end, a top end, and sidewall extending from the bottom end to the top end;
the bottom end includes the first channel; and
the sidewall includes the one or more second channels.

12. The nozzle of claim 11, wherein:
the bottom end of the interior cavity is substantially cylindrical;
the top end of the interior cavity is substantially conical; and
the sidewall tapers from the bottom end to the top end.

13. The nozzle of claim 8, wherein the first channel is substantially perpendicular to the one or more second channels.

14. An exhaust system, comprising:
an exhaust pipe configured to receive exhaust from an engine; and a nozzle located within the exhaust pipe, the nozzle comprising:
an interior cavity having a bottom end, a top end, and a sidewall extending from the bottom end to the top end;
a channel having a first outlet disposed at the bottom end of the interior cavity;
a passageway having a second outlet disposed at the sidewall of the interior cavity, the passageway extending substantially parallel to the channel;
a structure disposed within the interior cavity, the structure including:
a first side facing the bottom end of the interior cavity and having a substantially concave-shaped surface, wherein the substantially concave-shaped surface directly faces the first outlet of the channel; and
a leg extending from the bottom end of the interior cavity and coupled to the first side, the leg spacing the first side from the bottom end of the interior cavity;
a spray outlet disposed at the top end of the interior cavity, an exterior surface of the nozzle defining a plurality of distinct outlet apertures at the spray outlet; and
a supply line fluidly connected to the nozzle, wherein the supply line is configured to supply reductant to the channel and air to the passageway.

15. The exhaust system of claim 14, wherein:
the leg comprises a first leg;
the structure further includes a second leg extending from the bottom end of the interior cavity and coupled to the first side; and
the first leg is spaced apart from the second leg.

16. The exhaust system of claim 15, wherein the second outlet of the passageway faces a space disposed between the first leg and the second leg.

17. The exhaust system of claim 14, wherein the structure further includes a second side facing the top end of the interior cavity and having a substantially conical-shaped surface.

* * * * *